United States Patent
Marupaduga

(10) Patent No.: US 11,595,864 B1
(45) Date of Patent: Feb. 28, 2023

(54) PREDICTION OF HANDOVER TRIGGER AS BASIS TO CONTROL PRIMARY-UPLINK-PATH SWITCHING FOR DUAL-CONNECTED DEVICE

(71) Applicant: Sprint Spectrum L.P., Overland Park, KS (US)

(72) Inventor: Sreekar Marupaduga, Overland Park, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 0 days.

(21) Appl. No.: 16/949,854

(22) Filed: Nov. 17, 2020

(51) Int. Cl.
*H04W 36/00* (2009.01)
*H04W 36/14* (2009.01)
*H04W 64/00* (2009.01)

(52) U.S. Cl.
CPC . *H04W 36/00837* (2018.08); *H04W 36/0069* (2018.08); *H04W 36/14* (2013.01); *H04W 64/00* (2013.01)

(58) Field of Classification Search
None
See application file for complete search history.

(56) References Cited

U.S. PATENT DOCUMENTS

| 7,433,333 B2 | 10/2008 | Fong et al. |
| 2016/0021585 A1* | 1/2016 | Pedersen ............... H04W 36/32 370/331 |
| 2016/0198374 A1 | 7/2016 | Virtej et al. |
| 2019/0289505 A1* | 9/2019 | Thomas ................. H04W 36/08 |
| 2020/0337101 A1 | 10/2020 | Brooks et al. |

OTHER PUBLICATIONS

First Action Interview Pilot Program Pre-Interview Communication from U.S. Appl. No. 16/949,857, dated Sep. 9, 2022.

* cited by examiner

*Primary Examiner* — Suhail Khan
(74) *Attorney, Agent, or Firm* — McDonnell Boehnen Hulbert & Berghoff LLP

(57) ABSTRACT

A method and system for controlling uplink-path switching of a user equipment device (UE) when the UE has at least two co-existing air-interface connections including a first air-interface connection with a first access node and a second air-interface connection with a second access node, and where one of the first and second air-interface connections defines a primary uplink path of the UE. An example method includes (i) predicting that a handover trigger for handover of the UE from the first access node to a third access node will occur and (ii) responsive to at least the prediction that the handover trigger will occur, but before the handover trigger occurs, forgoing application of at least a portion of an uplink-path-switch control process for dynamically controlling which of the UE's connections will be set as the UE's primary uplink path.

20 Claims, 3 Drawing Sheets

PREDICTION OF HANDOVER TRIGGER AS BASIS TO CONTROL PRIMARY-UPLINK-PATH SWITCHING FOR DUAL-CONNECTED DEVICE

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

Further, each carrier could be defined within an industry standard frequency band, by its frequency channel(s) being defined within the frequency band. Examples of such frequency bands include, without limitation, (i) bands 2, 4, 12, 25, 26, 66, 71, and 85, supporting FDD carriers (ii) band 41, supporting TDD carriers, and (iii) bands n258, n260, and n261, supporting FDD and TDD carriers.

The coverage provided by a given access node on a given carrier could also be considered to define a respective "cell". Thus, if an access node provides coverage and service on two carriers, the access node would be providing two cells, one on each carrier. And if two access nodes provide coverage and service on the same carrier as each other, the access nodes would be providing different respective cells than each other, both on the same carrier.

On the downlink and uplink, the coverage of each such cell could define an air interface configured in a specific manner to provide physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random access signaling from UEs to the access node, and other resource elements could be reserved to carry other control signaling such as PRB-scheduling requests, acknowledgement messaging, and channel-quality reports from UEs to the access node.

OVERVIEW

When a UE enters into coverage of an example network, the UE could detect threshold strong coverage of an access node on a particular carrier. For instance, the UE could scan for and detect coverage of the access node on the carrier and could determine that reference signal receive power (RSRP) from the access node on that carrier is threshold high. And the UE could then engage in random-access signaling and connection signaling, such as Radio Resource Control (RRC) signaling, with the access node to establish an air-interface connection (e.g., RRC connection) through which the access node will then serve the UE on that carrier. Further, the access node could establish in data storage a context record for the UE, noting the carrier on which the UE is connected and noting associated service information.

In addition, if the UE is not already registered for service with the core network, the UE could transmit to the access node an attach request, which the access node could forward to a core-network controller for processing. And the core-network controller and access node could then coordinate setup for the UE of one or more user-plane bearers, each of which could include (i) an access-bearer portion that extends between the access node and a core-network gateway system that provides connectivity with a transport network and (ii) a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway system receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) scheduling directive that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI scheduling directive that designates those upcoming PRBs. And the UE could then accordingly transmit the transport block to the access node in the designated PRBs.

Further, when a UE is so connected with an access node, the UE could also monitor coverage strength from the access node and coverage strength from one or more other access nodes in the vicinity, to help ensure that the UE continues to be served with the best available coverage. Applying defined measurement thresholds, for instance, if the UE detects that coverage strength from its serving access node is threshold weak and coverage strength from another access node is threshold strong (e.g., threshold stronger than coverage strength from its serving access node), then the UE could provide a measurement report to its serving access node, and the serving access node could responsively coordinate handover of the UE to the other access node.

By way of example, the UE could be provisioned to regularly measure RSRP from its serving access node and to report the RSRP to the access node periodically or when the RSRP becomes sufficiently low. And when the RSRP drops below a threshold low level, the access node could then direct the UE to scan for other available coverage for possible handover, and the UE could then scan for and detect the threshold strong coverage from the other access node and responsively report to the detected coverage to the serving access node. In response to this measurement report, the UE's serving access node, as source access node, could then engage in handover signaling with the other access node, as target access node, to coordinate handover of the UE and could then direct and thus cause the UE to transition from being served by the source access node to being served instead by the target access node.

Yet further, as the industry advances from one generation of wireless technology to the next, or in other scenarios, networks and UEs may also support dual-connectivity service, where a UE is served on multiple co-existing connections, perhaps according to different respective RATs.

For instance, a network could include access nodes that provide coverage and service according to a first RAT ("first-RAT access nodes") and access nodes that provide coverage and service according to a second RAT ("second-RAT access nodes"), and a UE positioned concurrently within coverage of both a first-RAT access node and a second-RAT access node could have a first radio configured to engage in service according to the first RAT and a second radio configured to engage in service according to the second RAT. With this arrangement, the UE may be able to establish a first air-interface connection with the first-RAT access node according to the first RAT and a second air-interface connection with the second-RAT access node according to the second RAT, and the access nodes may then concurrently serve the UE over those connections according to their respective RATs, each in the manner discussed above for instance.

Such dual connectivity (or "non-standalone" (NSA) connectivity) could also help to facilitate increased peak data-rate of communications, by multiplexing the UE's communications across the multiple air-interface connections. Further or alternatively, dual connectivity may provide other benefits compared with serving a UE on a single connection (as "standalone" (SA) connectivity).

In an example dual-connectivity implementation, the UE could be primarily connected under the first RAT. As such, the UE's serving first-RAT access node could operate as a master node (MN) for the UE, responsible for coordinating setup, management, and teardown of the UE's dual-connectivity service, controlling handover of the UE, and functioning as an anchor point for RRC signaling and core-network control signaling related to the dual-connected UE. Whereas, the UE's serving second-RAT access node access node could operate merely as a secondary node (SN) mainly to provide increased aggregate frequency bandwidth and associated increased peak data rate for the UE.

When a UE that supports dual-connectivity service enters into coverage of such a system, the UE could initially scan for first-RAT coverage and detect threshold strong coverage of provided by a first-RAT access node on a given carrier, and the UE could then engage in signaling to establish a first-RAT connection between the UE and that first-RAT access node on that carrier as discussed above. Further, the first-RAT access node may also add one or more additional carriers to the UE's first-RAT connection to provide the UE with carrier-aggregation service.

In addition, perhaps having determined from profile data that the UE is dual-connectivity-capable, the UE's serving first-RAT access node, now acting as the UE's MN, could engage in a process to coordinate setup of dual connectivity for the UE.

Coordinating setup of dual connectivity for the UE could involve first identifying a second-RAT access node to be an SN for the UE, with the identifying being based on measurement reporting from the UE and/or on coverage assumptions. And coordinating setup of the dual connectivity for the UE could then involve engaging in signaling with the identified SN and with the UE, to establish a second-RAT connection between the UE and the SN on a carrier on which the SN access node operates. And this second-RAT connection with the SN could likewise be configured to encompass multiple carriers.

In addition, coordinating setup of dual connectivity for the UE could also involve engaging in signaling, for each of one or more bearers established for the UE, to split the bearer so that the MN and SN can then each serve a respective portion of the UE's data communications. For instance, the MN could engage in signaling to establish a bearer split at the core-network gateway system, with one access-bearer leg extending between the gateway system and the MN and another access-bearer leg extending between the gateway system and the SN. Alternatively, the MN could engaging signaling to establish a bearer split at the MN, with the UE's access bearer remaining anchored at the MN and a branch of the access bearer extending between the MN and the SN. And still alternatively, the MN could engage in signaling to establish a bearer split at the SN, with the UE's access bearer being transferred to and anchored at the SN and a branch of the access bearer extending between the SN and the MN.

With these first-RAT and second-RAT connections and possible split bearer so established for the UE, the MN and SN could then serve the UE with packet-data communications on their respective connections with the UE, each in the manner discussed above, for instance with a portion of data flowing over the UE's first-RAT connection between the UE and the MN concurrently with another portion of the data flowing over the UE's second-RAT connection between the UE and the SN.

In an example implementation, the UE's downlink user-plane data flow could be split between the UE's two connections. For instance, when the core-network gateway system has packet data destined to the UE, that data could flow over a split bearer like one of those noted above, with the MN ultimately receiving a portion of the data and transmitting that portion of data over the UE's first-RAT connection to the UE, and with the SN ultimately receiving another portion of the data and transmitting that other portion of data over the UE's second-RAT connection to the UE.

As to the uplink, however, to help conserve the UE's transmission power and battery power and/or for other reasons, the UE might be configured by default to operate in a single-connection-uplink mode in which the UE limits its uplink user-plane data flow to just one of the UE's connections, referred to as the UE's "primary uplink path". In that mode, when the UE has packet data to transmit on the transport network, the UE would transmit the data on just the UE's primary uplink path, and the data could then flow over an access bearer from the recipient access node ultimately to the core-network gateway system for output onto the transport network.

Further, upon occurrence of a trigger, such as a threshold high rate of uplink data flow from the UE, the UE could transition from the single-connection-uplink mode to a split-uplink mode in which the UE will split its uplink data flow between its connections. In the split-uplink mode, for instance, when the UE has data to transmit on the transport network, the UE could transmit a portion of that data over its first-RAT connection to the MN, and that data could flow over an access bearer from the MN ultimately to the core-network gateway system for output onto the transport network, and the UE could transmit another portion of the data over its second-RAT connection to the SN, and that data could similarly flow over an access bearer from the SN ultimately to the core-network gateway system for output onto the transport network. In addition, this uplink split could be configured to put a majority of the UE's uplink data flow on the UE's primary uplink path.

In practice, the UE's serving MN could be responsible for controlling which of the UE's connections will be the UE's primary uplink path. In an example implementation, the MN could base this control on a comparison or other consideration of performance of one or more of the UE's connections, keyed to any of various performance metrics.

Without limitation, for instance, the MN could base the control on a consideration of the UE's coverage strength, such as RSRP, respectively on either or each of the UE's connections, such as whether the UE's RSRP on one connection is higher (e.g., threshold higher) than the UE's RSRP on the other connection, or whether the UE's RSRP on a given one of the UE's connections is threshold high enough to justify that connection being the UE's primary uplink path. And the MN could then transmit to the UE an RRC message that indicates which of the UE's connections the UE should use as the UE's primary uplink path, and the UE could responsively set itself could operate accordingly.

With this arrangement, when a UE is dual connected and one of the UE's connections is set as the UE's primary uplink path, the UE's serving MN may engage in an ongoing uplink-path-switch control process to dynamically control whether to reconfigure the UE to make the UE's other connection the UE's primary uplink path. In this process, the MN could monitor for and detect when a trigger for such an uplink-path switch occurs, and the MN could respond to occurrence of that uplink-path-switch trigger by directing and thus causing the UE to switch to use the other connection as the UE's primary uplink path.

For instance, the MN could detect when performance of the UE's other connection is better (e.g., threshold better) than performance of the connection currently set as the UE's primary uplink path, and the MN could responsively transmit to the UE an RRC connection-reconfiguration message that directs and thus causes the UE to switch to use that other connection as the UE's primary uplink path, in response to which the UE may then transmit to the MN an RRC connection-complete message.

Although this uplink-path switching might be useful and desirable as a general matter, doing so in some situations might be wasteful. One such situation is where the UE is likely to soon hand over from the MN to a different access node.

In order for an MN to hand over a dual-connected UE from the MN to a target access node, the MN may first de-configure the UE's dual connectivity, such as by reversing the dual-connectivity setup process discussed above, to return the UE to standalone connectivity with the MN. Upon de-configuring the UE's dual connectivity, the MN may then process handover of the UE from the MN to the target access node. It could therefore be a relative waste of resources for the MN to engage in the uplink-path-switch control process for the UE in a scenario where the UE is likely to soon hand over from the MN, as, in that scenario, the UE's dual connectivity would likely soon go away in any event—so the question of which connection is the UE's primary uplink path would ultimately be moot.

The present disclosure provides a technical mechanism that may help to address this.

In accordance with the disclosure, when a UE has dual connectivity with at least an MN and an SN and the MN is configured to apply an uplink-path-switch control process for dynamically controlling which the UE' s connections will be the UE's primary uplink path, (i) the MN could make a prediction that a handover trigger for handover of the UE from the MN to a target access node will occur and (ii) in response to making this prediction, but before handover trigger occurs, the MN could proactively forgo application of at least a portion of the uplink-path-switch control process for dynamically controlling which of the UE's connections will be the UE's primary uplink path.

For instance, in response to predicting that a handover trigger for handover of the UE from the MN to a target access node will occur, but before that handover trigger occurs, the MN could discontinue the MN's process of monitoring to detect the occurrence of an uplink-path-switch trigger for triggering an uplink-path switch for the UE. And/or in response to predicting that a handover trigger for handover of the UE from the MN to a target access node will occur, but before that handover trigger occurs, the MN could forgo directing the UE to engage in the uplink path switch even if and when the MN detects occurrence of an uplink-path-switch trigger for triggering an uplink-path switch for the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

Figure 1:
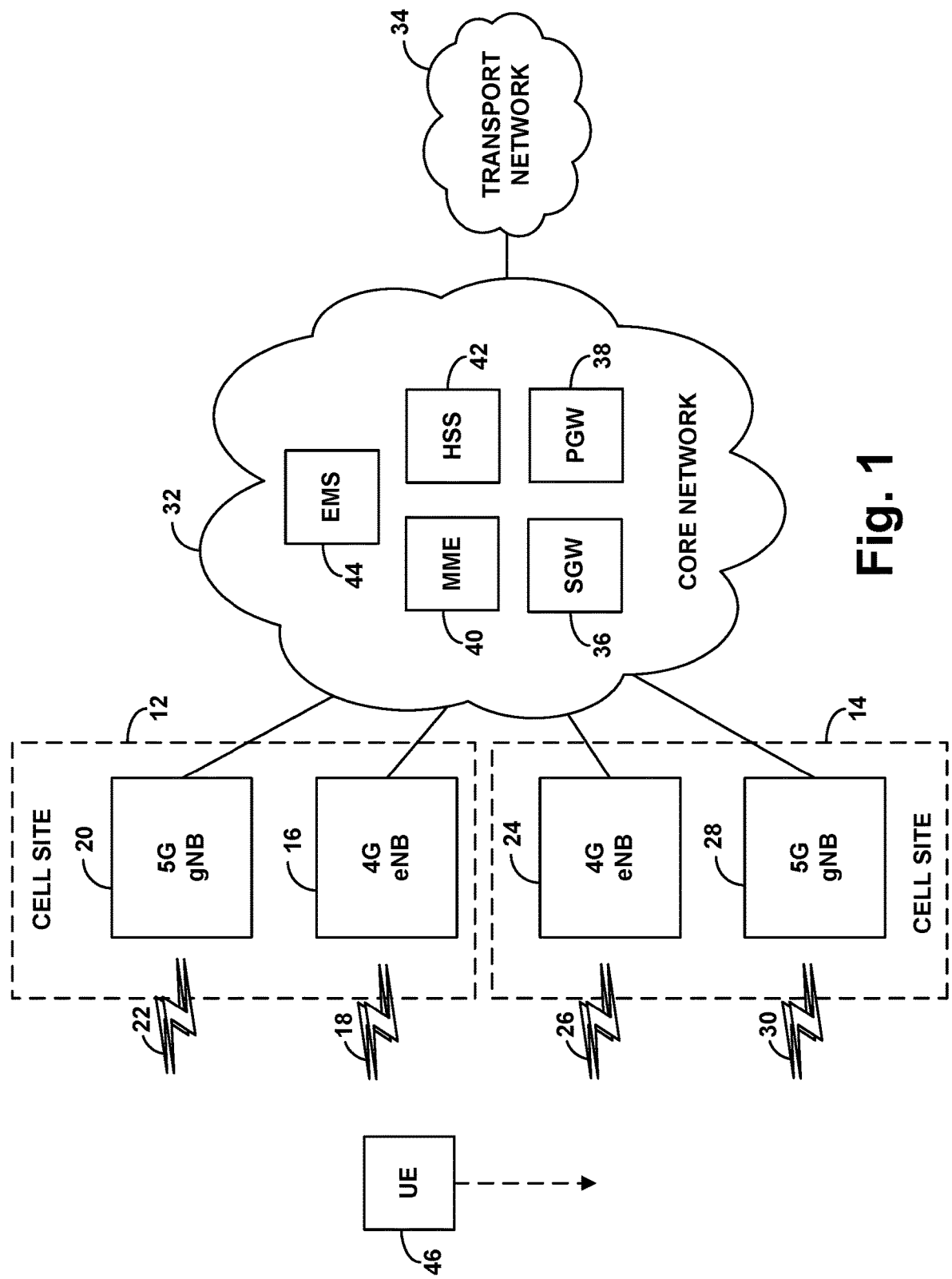
FIG. 1 is a simplified block diagram of an example wireless network arrangement in which various disclosed features can be implemented.

It should be understood, however, that the principles disclosed herein could extend to apply with respect to other scenarios as well, such as with respect to other RATs and other dual-connectivity configurations, including possibly single-RAT dual connectivity and/or dual-connectivity encompassing more than two connections. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations Referring to the drawings, FIG. 1 depicts an example network arrangement including two cell sites 12, 14. Cell site 12 is shown including a 4G eNB 16 configured to provide at least one 4G cell 18 and a 5G gNB 20 configured to provide at least one 5G cell 22. And cell site 14 is shown including a 4G eNB 24 configured to provide at least one 4G cell 26 and a 5G gNB 28 configured to provide at least one 5G cell 30. Each of these access nodes could be macro access nodes of the type configured to provide a wide range of coverage or could take other forms, such as a small cell access node, a relay, a femtocell access node, or the like, possibly configured to provide a smaller range of coverage.

To provide coverage and service in the illustrated cells, each access node could be configured with one or more antennas, power amplifiers, and associated circuitry that enables the access node to transmit and receive electromagnetic signals in a respective region defining a coverage footprint of its cell.

In an example arrangement, the access nodes in each cell site could also be configured so that the coverage footprints of their respective cells substantially overlap with each other, in order to allow UEs in the cell site to be served with EN-DC. For instance, in each cell site, the access nodes could be collocated with each other and could share a common antenna structure (e.g., antenna array) and/or other equipment configured to cause the access nodes' cells to extend in largely the same direction as each other and have largely the same geographic scope as each other, with exceptions.

Further, the 4G eNB 16 of cell site 12 and the 4G eNB 24 of cell site 14 could be configured so that the coverage footprints of their respective 4G cells 18 and 26 overlap at least partially with each other, in order to allow UEs to hand over between these 4G eNBs. For instance, a portion of 4G cell 18 distant from 4G eNB 16 might geographically overlap with a portion of 4G cell 26 distant from 4G eNB 24, so that a UE within that overlap region can engage in such handover. Other arrangements are possible as well.

Without limitation, the air interface of each of these cells could be structured as described above by way of example, being divided over time into frames, subframes, and symbol time segments, and over frequency into subcarriers, thus defining an array of air-interface resource elements grouped into PRBs allocable by the respective access node as noted above, for use to carry data to or from served UEs. Air-interface structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

Each of the access nodes is further shown interfaced with at least one core network 32. A representative core network 32 could be an evolved packet core (EPC) network, a next generation core (NGC) network, or another network and could provide connectivity with at least one transport network 34, such as the Internet. Further, the core network 32 could be a packet-switched network, compliant with the industry standard system architecture evolution (SAE) or another protocol, and thus various entities that communicate on the core network could each have an assigned Internet Protocol (IP) address and be configured to communicate with each other over packet-based tunnels or other communication interfaces.

In a representative implementation, each of the illustrated access nodes could be interfaced with an EPC network that functions as a legacy 4G core network, so that each cell site can support standalone-4G service provided by the cell site's 4G eNB and can provide EN-DC service provided cooperatively by the cell site's 4G eNB and 5G gNB. Further, each cell site's 5G gNB could also be interfaced with an NGC network functioning as a 5G core network, to facilitate possibly providing standalone 5G NR service. For simplicity, FIG. 1 depicts just an EPC network.

In the example shown, the core network 32 includes a serving gateway (SGW) 36, a packet data network gateway (PGW) 38, a mobility management entity (MME) 40, a home subscriber server (HSS) 42, and an element management system (EMS) 44.

With this arrangement, each access node could have an interface with the SGW 36, the SGW 36 could have an interface with the PGW 38, and the PGW 38 could provide connectivity with the transport network 34. In addition, the 4G eNB of each cell site could have an interface with the MME 40, the MME 40 could have an interface with the SGW 36, and the 4G eNBs could have an interface with each other, so that the MME 40 could coordinate setup of bearers for UEs to enable the UEs to engage in packet-data communication via 4G and 5G and so that the 4G eNBs can coordinate handover of UEs.

Still further, the HSS 42 could store or have access to UE profile records, which could specify service-subscription plans, UE configurations, and/or other such UE capability information, such as whether a UE is EN-DC capable for instance. And the EMS 44 could operate as a central repository of operational data for the wireless communication network and to control and manage operation of various network elements such as the access nodes.

FIG. 1 also illustrates an example UE 46 that is within coverage of example cell site 12 and may be served with EN-DC by cell site 12 but that may move or otherwise transition from coverage of cell site 12 to coverage of cell site 14. This UE could take any of the forms noted above, among other possibilities. Further, the UE could be equipped with a 4G LTE radio, a 5G NR radio, and associated circuitry and logic that enables the UE to engage in 4G LTE service, 5G NR service, and EN-DC service.

In line with the discussion above, when this UE initially enters into coverage of cell site 12, the UE could initially discover coverage of 4G cell 18 of the cell site and could determine that a reference signal of that cell is strong enough to justify connecting. The UE could then engage in random-access signaling and RRC signaling with 4G eNB 16 to establish a 4G connection with the 4G eNB 16 in 4G cell 18. Further, the UE could engage in attach signaling with the MME 40 via the 4G eNB 16, and the MME 40 and 4G eNB 16 could coordinate setup for the UE of at least one user-plane bearer, which could include an S1-U tunnel between the SGW 36 and the 4G eNB 16, an S5 tunnel between the SGW 36 and the PGW 38, and a DRB between the 4G eNB 16 and the UE.

In addition, in relation to the UE's connection and/or attachment process or at another time, the 4G eNB 16 could obtain capabilities data regarding the UE, including data indicating that the UE is EN-DC capable. For instance, the MME could obtain this data from the HSS 42 and provide the data to the 4G eNB 16, or the UE might report the data to the 4G eNB 16.

As the UE is EN-DC capable, the 4G eNB 16 could then work to configure EN-DC service for the UE. In line with the discussion above, this EN-DC setup process could include the 4G eNB 16, operating as the UE's MN (MeNB), engaging in signaling to add for the UE a secondary 5G connection with the 5G gNB 20 of cell site 12, the 5G gNB 20 operating as the UE's SN (SgNB). For instance, the 4G eNB 16 could transmit to the 5G gNB 20 an SgNB-Addition request to cause the 5G gNB 20 to allocate resources for a 5G connection for the UE on at least one 5G cell 22 provided by the 5G gNB 20. And the 4G eNB 16 could receive an SgNB-Addition-Request acknowledge message from the 5G gNB 20 and then engage in associated RRC signaling with the UE, in response to which the UE could then engage in signaling with the 5G gNB 20 to complete establishment of the 5G connection. Further, the process could also include the 4G eNB 16 engaging in signaling such as described above to establish a split bearer for the UE.

The cell site's 4G eNB 16 and 5G gNB 20 could then provide the UE with EN-DC service, concurrently serving the UE over their respective connections with the UE, each in the manner discussed above. For instance, when either access node receives data for transmission to the UE over the UE's connection with the access node, the access node could schedule and engage in transmission of the data in downlink PRBs from the access node to the UE. And when the UE has data to transmit to either access node over the UE's connection with the access node, the access node could schedule and the UE could engage in transmission of the data in uplink PRBs from the UE to the access node.

In line with the discussion above, the UE may also regularly monitor the UE's coverage from each access node and provide associated measurement reports, periodically and/or in response to detecting the occurrence of certain measurement events. For instance, the UE could measure RSRP of its 4G coverage from its serving 4G eNB 16 and transmit over its 4G connection to that 4G eNB 16 a measurement report specifying the UE's measured 4G RSRP. And the UE could also measure RSRP of its 5G coverage from its serving 5G gNB 20 and either (i) likewise report that 5G RSRP over the UE'S 4G connection to the 4G eNB 16 or (ii) report the 5G RSRP over the UE's 5G connection to the 5G gNB 20, which could then forward the report over an inter-access-node interface, such as an X2 interface, to the 4G eNB 16.

Further, the UE's data flow could be split between the UE's 4G and 5G connections as discussed above. For instance, when the PGW 36 receives user-plane data from the transport network 34 for transmission to the UE, that data may flow over a split access bearer, and the 4G eNB 16 may transmit a portion of the data over the UE's 4G connection to the UE, while the 5G gNB 20 may transmit another portion of the data over the UE's 5G connection to the UE. And when the UE has user-plane data to transmit on the transport network 38, the UE may transmit a portion of the data over its 4G connection to the 4G eNB 16, which may forward the data over an access bearer for transmission directly or indirectly through the core network 32 to the transport network 34, and the UE may transmit another portion of the data over its 5G connection to the 5G gNB 20, which may likewise forward the data over an access bearer for transmission directly or indirectly through the core network 32 to the transport network 34.

In addition, the UE could be set to treat one of the UE's connections as the UE's primary uplink path as discussed above, restricting the UE's uplink data flow to that connection until the level of data flow rises to a threshold level or other reason exists to offload some of the data flow to the UE's other connection, and/or providing a majority of the UE's uplink data flow on that connection in a split-uplink mode of operation.

In line with the discussion above, the 4G eNB, as the UE's MN, could control which of the UE's connections is set as the UE's primary uplink path. Upon initial establishment of EN-DC for the UE, the UE might default to use a particular one of the UE's connections (e.g., the UE's 5G connection) as the UE's primary uplink path, or the 4G eNB 16 may decide by default or based on one or more factors which of the UE's connections should be the UE's primary uplink path and may instruct and thus cause the UE to operate accordingly. Further, as discussed above, while the UE is served with EN-DC, the UE's serving 4G eNB could then apply an uplink-path-switch control process to dynamically control which of the UE's connections will be set as the UE's primary uplink path.

Without limitation, as discussed above, an example uplink-path-switch control process could involve the 4G eNB 16 monitoring performance of either or both of the UE's connections and determining based on the monitored performance whether to direct the UE to switch the UE's primary uplink path from the connection currently set as the UE's primary uplink path to the UE's other connection. In particular, the 4G eNB 16 could monitor to detect when an uplink-path-switch trigger occurs and, in response to occurrence of that uplink-path-switch trigger, could then transmit to the UE and RRC connection-reconfiguration message that directs and thus causes the UE to engage in the uplink path switch.

Further, as noted above, the performance at issue could relate to coverage strength, such as RSRP. For example, an uplink-path-switch trigger could be that the UE's RSRP on the connection that is not currently set as the UE's primary uplink path is threshold higher than the UE's RSRP on the connection currently set as the UE's primary uplink path. Or an uplink-path-switch trigger could be that the UE's RSRP on the connection currently set as the UE's primary uplink path is threshold low or that the UE's RSRP on the connection not currently set as the UE's primary uplink path is threshold high. Other uplink-path-switch triggers, whether or not RSRP related, could be considered as well.

As noted above and as shown in FIG. 1, when the UE is served with EN-DC by 4G eNB 16 and 5G gNB 20, a trigger may also occur for handover of the UE from cell site 12 to cell site 14.

This handover trigger could take various forms. For instance, while the UE is served with EN-DC by 4G eNB 16 and 5G gNB 20, the UE may regularly monitor its 4G coverage strength from the 4G eNB 16 and from other 4G eNBs in the vicinity. And the UE may detect and report to its serving 4G eNB 16 that the UE's RSRP from 4G eNB 16 is threshold low and that the UE's RSRP from the 4G eNB 24 of cell site 14 is threshold high (e.g., threshold higher), which the 4G eNB 16 could treat as an example handover trigger.

In response to detecting the occurrence of this or another handover trigger for handover of the UE from 4G eNB 16 to 4G eNB 24, the 4G eNB 16 could then engage in handover signaling with the target 4G eNB 24 to arrange for the handover. For instance, the 4G eNB 16 could transmit a handover request message to the 4G eNB 24 to prepare the 4G eNB 24 for the handover, the 4G eNB 24 could respond to the 4G eNB 16 with a positive handover response message, and the 4G eNB 16 could then direct and thus cause the UE to transition from being served by the 4G eNB 16 to being served instead by the target 4G eNB 24.

Further in line with the discussion above, when the EN-DC-connected UE's serving 4G eNB 16 detects occurrence of the handover trigger for handover of the UE from the 4G eNB 16 to the target 4G eNB 24, the 4G eNB 16 could then first de-configure the UE's EN-DC before processing the handover. For instance, the 4G eNB 16 could reverse the EN-DC-setup process discussed above, undoing the UE's split bearer and tearing down the UE's 5G connection with the UE's serving 5G gNB 20, to return the UE to standalone 4G connectivity with the 4G eNB 16. And then the 4G eNB 16 could process standalone-4G handover of the UE to the target 4G eNB 24. (Once the UE so hands over, the target 4G eNB 24 may then newly set up EN-DC for the UE to be served by the 4G eNB 24 and the 5G gNB 28.)

With this example arrangement, the present disclosure provides for having the UE's serving 4G eNB 16 (i) predict that a handover trigger for handover of the UE from the 4G eNB 16 (to the target 4G eNB) will occur and (ii) before the occurrence of that handover trigger, respond to the prediction by discontinuing application of at least one portion of the uplink-path-switch control process for dynamically controlling which of the UE's connections will be set as the UE's primary uplink path.

The 4G eNB 16 could predict in various ways that a handover trigger for handover of the UE from the 4G eNB 16 will occur, i.e., making this prediction before the 4G eNB 16 actually detects or learns of the occurrence of the handover trigger for the handover.

Without limitation, one way that the 4G eNB 16 could make this prediction is by use of geolocation tracking. For instance, the 4G eNB 16 could be provisioned with or otherwise have access to RF mapping data that indicates (e.g., estimates) the geographic bounds of the 4G eNB's cell 18 and the geographic bounds of the cell 26 provided by target 4G eNB 24. This data could be established in advance by drive-testing and/or other analysis and could be stored for access by the 4G eNB 16 or by another entity that the 4G eNB 16 could query. The 4G eNB 16 could then further track the geolocation of the UE over time as the 4G eNB 16 serves the UE, using any of various well known location-determination techniques and could thereby determine that the UE is relatively distant from the 4G eNB 16 and headed toward 4G eNB 24. And by comparing the UE's geolocation over time with the geolocation scope of each cell, the 4G eNB 16 could determine that the UE is on a trajectory with particular speed of movement that will result in the UE transitioning from coverage of 4G eNB 16 to coverage of 4G eNB 24 in a threshold short time. Effectively, this scenario could represent a prediction that a handover trigger for handover of the UE from the 4G eNB 16 to the 4G eNB 24 is likely to soon occur—e.g., that the UE's RSRP from the 4G eNB 16 will become threshold low and that the UE's RSRP from the 4G eNB 24 is likely to become threshold high (e.g., threshold higher) in a short time.

Further, another example way that the 4G eNB 16 could make this prediction is by detecting that the UE has been ping-ponging between the 4G eNB 16 and the 4G eNB 24. For instance, if the UE is in the area of coverage overlap of 4G cells 18 and 26, the UE might repeatedly hand over back and forth between the 4G eNBs. In practice, the 4G eNB 16 could maintain records of these handovers and predict based on a recent history of the UE ping-ponging between 4G eNB 16 and 4G eNB 24 that the UE is likely to soon again hand over from 4G eNB 16 to 4G eNB 24, i.e., that a handover trigger for such a handover is likely to soon occur. Other example prediction methods could be used as well.

In response to at least predicting that a handover trigger for handover of the UE from the 4G eNB 16 will occur, but before the handover trigger occurs (i.e., without waiting for the handover trigger to occur, if it does at all), the 4G eNB 16 could then forgo application of at least a portion of its uplink-path-switch control process for dynamically controlling which of the UE's connections will be set as the UE's primary uplink path.

By way of example, in response to at least predicting that a handover trigger for handover of the UE from the 4G eNB 16 will occur, but before the handover trigger occurs, the 4G eNB 16 could stop monitoring to detect occurrence of an uplink-path-switch trigger for triggering an uplink-path switch for the UE. Thus, even if such an uplink-path-switch trigger occurs, the 4G eNB 16 may not detect it and therefore may not direct/cause the UE to engage in an uplink-path switch.

Alternatively or additionally, in response to at least predicting that a handover trigger for handover of the UE from the 4G eNB 16 will occur, but before the handover trigger occurs, the 4G eNB 16 could otherwise forgo directing the UE to engage in an uplink-path switch. For instance, even if the 4G eNB 16 detects the occurrence of an uplink-path-switch trigger for triggering an uplink-path switch for the UE, the 4G eNB 16 could forgo responsively directing the UE to engage in the uplink-path switch. Other examples may be possible as well.

Note also that some or all of these operations could be carried out by or with the assistance of another entity, such as the EMS 44, a mobile location system (MLS) (not shown), or another computing system. For instance, the EMS 44 or an MLS could track UE location to make or facilitate making a prediction that a handover trigger for handover of the UE from 4G eNB 16 to 4G eNB 24 is likely to soon occur and could signal to the 4G eNB 16 accordingly. Upon making that prediction, the 4G eNB 16 could then responsively forgo at least a portion of the uplink-path-switch control process for controlling which of the UE's connections will be set as the UE's primary uplink path. Still further, in another example, the uplink-path-switch control process could also be carried out by one or more other entities, perhaps even by the UE itself. Other variations are possible as well.

Figure 2:
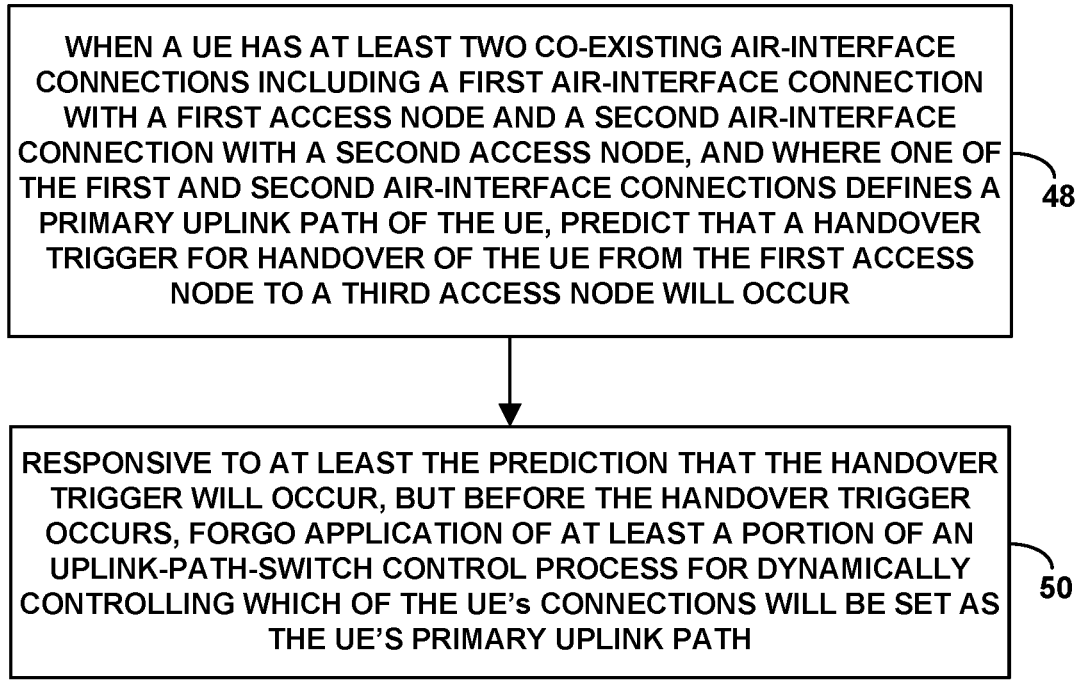
FIG. 2 is a flow chart depicting an example method in accordance with the disclosure.

FIG. 2 is a flow chart depicting a method that could be carried out in accordance with the present disclosure to control uplink-path switching of a UE when the UE has at least two co-existing air-interface connections including a first air-interface connection with a first access node and a second air-interface connection with a second access node, and where one of the first and second air-interface connections defines a primary uplink path of the UE. And as noted above, these air-interface connections could operate according to different RATs than each other, such as one being a 4G LTE connection and the other being a 5G NR connection, among other possibilities.

As shown in FIG. 2, at block 48, the method includes predicting that a handover trigger for handover of the UE from the first access node to a third access node will occur. And at block 50, the method includes, responsive to at least the prediction that the handover trigger will occur, but before the handover trigger occurs (whether or not it ultimately occurs), forgoing application of at least a portion of an uplink-path-switch control process for dynamically controlling which of the UE's connections will be set as the UE's primary uplink path.

In line with the discussion above, the air-interface connection that defines the primary uplink path of the UE could be the connection to which the UE restricts its uplink user-plane transmission from the UE unless and until a trigger condition causes the UE to split the uplink user-plane transmission between the first and second air-interface connections, and/or could be the connection on which the UE provides a majority of the UE's uplink user-plane communication.

Further, as discussed above, this method could be carried out by the first access node, among other possibilities. And to facilitate the handover of the UE from the first access node to the third access node, the first access node could coordinate release of the UE's second air-interface connection with the second access node (e.g., de-configuring the UE's dual connectivity) and could then coordinate the handover of the UE from the first access node to the second access node.

In addition, as discussed above, the act of predicting that the handover trigger for handover of the UE from the first access node to a third access node will occur could be based on various factors. For instance, the predicting could be based on geolocation tracking of the UE in relation to geographic scope of coverage of the first access node and in relation to geographic scope of coverage of the third access node. And/or the predicting could be based on determining that the UE has been ping-ponging between being connected with the first access node and being connected with the third access node. Further, as noted above, the handover trigger for the handover of the UE could comprise a measurement event related to coverage strength from the first access node and coverage strength from the second access node, such as an RSRP measurement event for instance.

Still further, as noted above, the uplink-path-switch control process could involve (i) monitoring to determine when an uplink-path-switch trigger occurs for triggering an uplink-path switch for the UE and (ii) responsive to occurrence of the uplink-path-switch trigger, causing the UE to engage in the uplink-path switch. And the act of forgoing application of at least a portion of the uplink-path-switch control process for dynamically controlling which of the UE's connections will be set as the UE's primary uplink path could involve discontinuing the monitoring and/or forgoing causing the UE to engage in the uplink-path switch even if the uplink-path-switch trigger occurs, among other possibilities.

Figure 3:
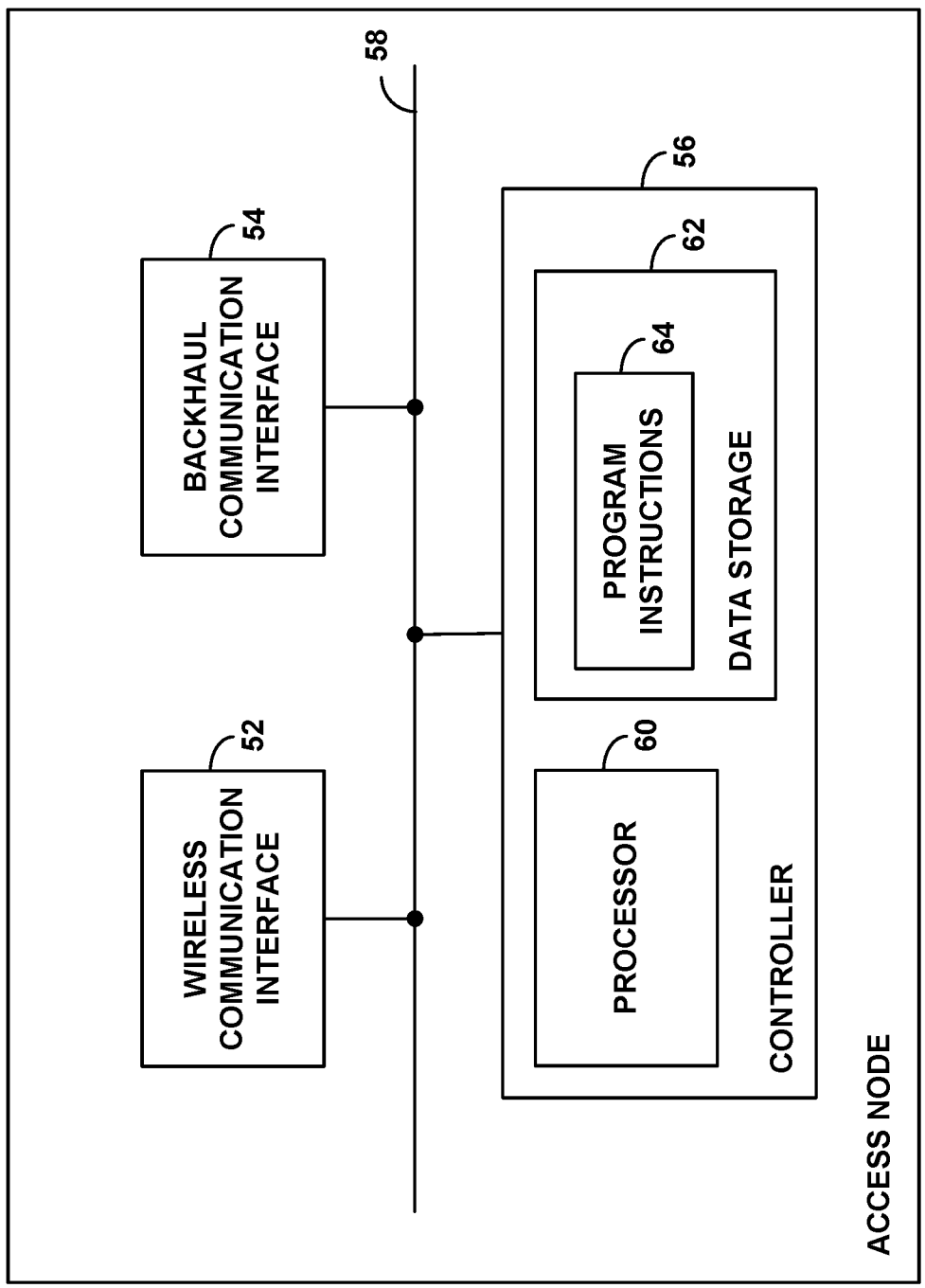
FIG. 3 is a simplified block diagram of an example access node operable in accordance with the disclosure.

FIG. 3 is next a simplified block diagram of an example first access node that could implement various features described herein, to control uplink-path switching of a user equipment device (UE) when the UE has at least two co-existing air-interface connections including a first air-interface connection with the first access node and a second air-interface connection with a second access node, where one of the first and second air-interface connections defines a primary uplink path of the UE.

As shown in FIG. 3, the example first access node includes at least one wireless communication interface 52, at least one backhaul communication interface 54, and at least one controller 56, all of which could be integrated together and/or communicatively linked together by a system bus, network, or other connection mechanism 58.

In an example implementation, the at least one wireless communication interface 52 could comprise an antenna structure, which could be tower mounted or could take other forms, and associated components such as a power amplifier and a wireless transceiver, so as to facilitate providing coverage on one or more carriers and serving the UE over the first air-interface connection. And the at least one backhaul communication interface 54 could comprise network communication interface such as an Ethernet interface, through which the first access node engages in backhaul communication.

Further, the at least one controller 56 could comprise a processor 60 (e.g., one or more general purpose processors and/or one or more specialized processors) programmed to cause the first access node to carry out various operations such as those discussed herein. For instance, the controller 56 could comprise non-transitory data storage 62 (e.g., one or more magnetic, optical, or flash storage components, necessarily non-transitory) which could store program instructions 64 executable by the one or more processor to cause the first access node to carry out such operations.

Various other features discussed herein can be implemented in this context as well, and vice versa.

The present disclosure also contemplates at least one non-transitory computer readable medium (e.g., one or more magnetic, optical, of flash storage components, necessarily non-transitory) having stored thereon (e.g., being encoded with) or otherwise containing program instructions executable by a processor to carry out various operations as described herein.

Exemplary embodiments have been described above. Those skilled in the art will understand, however, that changes and modifications may be made to these embodiments without departing from the true scope and spirit of the invention.

What is claimed is:

1. A method for controlling uplink-path switching of a user equipment device (UE) when the UE has at least two co-existing air-interface connections including a first air-interface connection with a first access node and a second air-interface connection with a second access node, wherein one of the first and second air-interface connections defines a primary uplink path of the UE, the method comprising:
    predicting that a handover trigger for handover of the UE from the first access node to a third access node will occur; and
    responsive to at least the prediction that the handover trigger will occur, but before the handover trigger occurs, forgoing application of at least a portion of an uplink-path-switch control process for dynamically controlling which of the UE's connections will be set as the UE's primary uplink path,
    wherein the uplink-path-switch control process comprises switching between (i) having the first air-interface connection rather than the second air-interface connection be the UE's primary uplink path and (ii) having the second air-interface connection rather than the first air-interface connection be the UE's primary uplink path, and
    wherein forgoing application of at least a portion of the uplink-path-switch control process comprises an action selected from the group consisting of (i) discontinuing monitoring to detect occurrence of an uplink-path-switch trigger for triggering the switching and (ii) upon detecting occurrence of an uplink-path-switch trigger for triggering the switching, forgoing directing the UE to engage in the switching.

2. The method of claim 1, wherein the UE restricts, to the one air-interface connection defining the UE's primary uplink path, uplink user-plane transmission from the UE unless and until a trigger condition causes the UE to split the uplink user-plane transmission between the first and second air-interface connections.

3. The method of claim 1, wherein the method is carried out by the first access node.

4. The method of claim 3, wherein, to facilitate the handover of the UE from the first access node to the third access node, the first access node coordinates release of the UE's second air-interface connection with the second access node and then coordinates the handover of the UE from the first access node to the second access node.

5. The method of claim 1, wherein predicting that the handover trigger for handover of the UE from the first access node to a third access node will occur is based on geolocation tracking of the UE in relation to geographic scope of coverage of the first access node and in relation to geographic scope of coverage of the third access node.

6. The method of claim 1, wherein predicting that the handover trigger for handover of the UE from the first access node to the third access node will occur is based on determining that the UE has been ping-ponging between being connected with the first access node and being connected with the third access node.

7. The method of claim 1, wherein the handover trigger for the handover of the UE comprises a measurement event related to coverage strength from the first access node and coverage strength from the second access node.

8. The method of claim 1, wherein the first air-interface connection and second air-interface connection operate according to different radio access technologies than each other.

9. A first access node operable to control uplink-path switching of a user equipment device (UE) when the UE has at least two co-existing air-interface connections including a first air-interface connection with the first access node and a second air-interface connection with a second access node, wherein one of the first and second air-interface connections defines a primary uplink path of the UE, the first access node comprising:
    at least one wireless communication interface including an antenna structure through which to serve the UE over the first air-interface connection;
    at least one backhaul communication interface through which the engage in backhaul communication; and
    at least one controller, wherein the at least one controller causes the first access node to carry out operations including:
        predicting that a handover trigger for handover of the UE from the first access node to a third access node will occur, and
        responsive to at least the prediction that the handover trigger will occur, but before the handover trigger occurs, forgoing application of at least a portion of an uplink-path-switch control process for dynamically controlling which of the UE's connections will be set as the UE's primary uplink path,
        wherein the uplink-path-switch control process comprises switching between (i) having the first air-interface connection rather than the second air-interface connection be the UE's primary uplink path and (ii) having the second air-interface connection rather than the first air-interface connection be the UE's primary uplink path, and
        wherein forgoing application of at least a portion of the uplink-path-switch control process comprises an action selected from the group consisting of (i) discontinuing monitoring to detect occurrence of an uplink-path-switch trigger for triggering the switching and (ii) upon detecting occurrence of an uplink-path-switch trigger for triggering the switching, forgoing directing the UE to engage in the switching.

10. The first access node of claim 9, wherein the at least one controller comprises a processor, non-transitory data storage, and program instructions stored in the non-transitory data storage and executable by the processor to cause the first access node to carry out the operations.

11. The first access node of claim 9, wherein the UE restricts, to the one air-interface connection defining the UE's primary uplink path, uplink user-plane transmission from the UE unless and until a trigger condition causes the UE to split the uplink user-plane transmission between the first and second air-interface connections.

12. The first access node of claim 9, wherein, to facilitate the handover of the UE from the first access node to the third access node, the first access node coordinates release of the UE's second air-interface connection with the second access node and then coordinates the handover of the UE from the first access node to the second access node.

13. The first access node of claim 9, wherein predicting that the handover trigger for handover of the UE from the first access node to a third access node will occur is based on geolocation tracking of the UE in relation to geographic scope of coverage of the first access node and in relation to geographic scope of coverage of the third access node.

14. The first access node of claim 9, wherein predicting that the handover trigger for handover of the UE from the first access node to the third access node will occur is based on determining that the UE has been ping-ponging between being connected with the first access node and being connected with the third access node.

15. The first access node of claim 9, wherein the handover trigger for the handover of the UE comprises a measurement event related to coverage strength from the first access node and coverage strength from the second access node.

16. At least one non-transitory computer-readable medium containing instructions executable by at least one processor to control uplink-path switching of a user equipment device (UE) when the UE has at least two co-existing air-interface connections including a first air-interface connection with the first access node and a second air-interface connection with a second access node, wherein one of the first and second air-interface connections defines a primary uplink path of the UE, the operations comprising:
  predicting that a handover trigger for handover of the UE from the first access node to a third access node will occur; and
  responsive to at least the prediction that the handover trigger will occur, but before the handover trigger occurs, forgoing application of at least a portion of an uplink-path-switch control process for dynamically controlling which of the UE's connections will be set as the UE's primary uplink path,
  wherein the uplink-path-switch control process comprises switching between (i) having the first air-interface connection rather than the second air-interface connection be the UE's primary uplink path and (ii) having the second air-interface connection rather than the first air-interface connection be the UE's primary uplink path, and
  wherein forgoing application of at least a portion of the uplink-path-switch control process comprises an action selected from the group consisting of (i) discontinuing monitoring to detect occurrence of an uplink-path-switch trigger for triggering the switching and (ii) upon detecting occurrence of an uplink-path-switch trigger for triggering the switching, forgoing directing the UE to engage in the switching.

17. The at least one non-transitory computer-readable medium claim 16, wherein the UE restricts, to the one air-interface connection defining the UE's primary uplink path, uplink user-plane transmission from the UE unless and until a trigger condition causes the UE to split the uplink user-plane transmission between the first and second air-interface connections.

18. The at least one non-transitory computer-readable medium claim 16, wherein the UE restricts, to the one air-interface connection defining the UE's primary uplink path, uplink user-plane transmission from the UE unless and until a trigger condition causes the UE to split the uplink user-plane transmission between the first and second air-interface connections.

19. The at least one non-transitory computer-readable medium claim 16, wherein, to facilitate the handover of the UE from the first access node to the third access node, the first access node coordinates release of the UE's second air-interface connection with the second access node and then coordinates the handover of the UE from the first access node to the second access node.

20. The at least one non-transitory computer-readable medium claim 16, wherein predicting that the handover trigger for handover of the UE from the first access node to a third access node will occur is based on a factor selected from the group consisting of (i) geolocation tracking of the UE in relation to geographic scope of coverage of the first access node and in relation to geographic scope of coverage of the third access node and (ii) determining that the UE has been ping-ponging between being connected with the first access node and being connected with the third access node.

* * * * *